United States Patent [19]

Chang

[11] 4,300,930
[45] Nov. 17, 1981

[54] MINIMUM DISPERSION AT 1.55 μM FOR SINGLE-MODE STEP-INDEX OPTICAL FIBERS

[75] Inventor: Ching T. Chang, San Diego, Calif.

[73] Assignee: The United States of America as represented by the Secretary of the Navy, Washington, D.C.

[21] Appl. No.: 202,848

[22] Filed: Oct. 31, 1980

[51] Int. Cl.$^3$ .................... C03B 37/075; G02B 5/14
[52] U.S. Cl. .................... 65/3.11; 350/96.30
[58] Field of Search ............ 65/3.11; 350/96.30

[56] References Cited

U.S. PATENT DOCUMENTS

| | | | |
|---|---|---|---|
| 3,646,462 | 2/1972 | Snitzer | 350/96.30 |
| 3,806,224 | 4/1974 | MacChesney et al. | 350/96.30 |
| 3,823,997 | 7/1974 | Gloge et al. | 350/96.30 |
| 3,901,674 | 8/1975 | Strack et al. | 65/3.11 |
| 3,902,879 | 9/1975 | Siegmund | 65/3.11 |
| 3,966,300 | 6/1976 | Bernsee | 350/96.30 X |
| 4,089,586 | 5/1978 | French et al. | 350/96.30 |
| 4,205,900 | 6/1980 | Eve | 350/96.30 X |

OTHER PUBLICATIONS

Macida et al., "1.5 μm Optical Transmission Experiments . . . ", Electron. Lett., vol. 15, 1979, pp. 219–220.
Rudolph et al., "Approximations for the Eigenvalues . . . ", Nachrichtentech Z. 29, 1976, pp. 328–329.
Miller et al., *Optical Fiber Telecommunication*, Academic Press, New York, 1979, pp. 246–255.
Miya et al., "Ultimate Low-Loss Single-Mode Fibre . . . ", Electron. Lett. vol. 15, 1979, pp. 106–108.
Chang, "Minimum Dispersion in a Single-Mode Step-Index Optical Fiber"; Applied Optics; vol. 18, No. 14; Jul. 15, 1979; pp. 2516–2522.
Tsuchiya et al., "Dispersion-Free Single Mode Fibre . . . ", Electron. Lett. vol. 15, 1979, pp. 476–478.
White et al., "Zero Total Dispersion in Step-Index Monomode Fibres . . . ", Electron. Lett., vol. 15, 1979, pp. 396–397.

*Primary Examiner*—Richard V. Fisher
*Attorney, Agent, or Firm*—Richard S. Sciascia; Ervin F. Johnston; Thomas Glenn Keough

[57] ABSTRACT

Transmission of wideband data through single-mode optical fibers is feasible due to far less dispersion. The appropriate index difference between the core and cladding and the dimensions of the core diameter are identified and selected to achieve minimum total dispersion at 1.55 μm for single-mode step index fibers. A minimum total dispersion results from a cancellation between the material and waveguide dispersions which is owed to the proper selection of these parameters.

3 Claims, 6 Drawing Figures

TABLE I. $\lambda_0$ represents the optimum wavelength where the first order dispersion (dN/dλ) is zero. T and V are the second order residual dispersion and the normalized frequency evaluated at $\lambda_0$. $\delta\lambda$ is the shift in optimun wavelengh due to waveguide dispersion.

| Step-Index Fiber | Core Diameter 2a(μm) | Relative Index Difference Δ | Material Composition | Material Dispersion $\lambda_0$ (μm) | Material Dispersion T [ps/(km·nm$^2$)] | Total Dispersion $\lambda_0$ (μm) | Total Dispersion T [ps/(km·nm$^2$)] | V | $\delta\lambda$ (nm) |
|---|---|---|---|---|---|---|---|---|---|
| A | 9.4 | 0.0019 | quenched SiO$_2$ | 1.276 | 0.0124 | 1.31 | 0.0107 | 2.0 | 34 |
| B | 3.63 | 0.0215 | quenched SiO$_2$ | 1.276 | 0.0124 | 1.55 | 0.0015 | 2.2 | 274 |

TABLE I. $\lambda_0$ represents the optimum wavelength where the first order dispersion $(dN/d\lambda)$ is zero. T and V are the second order residual dispersion and the normalized frequency evaluated at $\lambda_0$. $\delta\lambda$ is the shift in optimun wavelengh due to waveguide dispersion.

| Step-Index Fiber | Core Diameter 2a($\mu$m) | Relative Index Difference $\Delta$ | Material Composition | Material Dispersion | | Total Dispersion | | | |
|---|---|---|---|---|---|---|---|---|---|
| | | | | $\lambda_0$ ($\mu$m) | T [ps/(km·nm$^2$)] | $\lambda_0$ ($\mu$m) | T [ps/(km·nm$^2$)] | V | $\delta\lambda$ (nm) |
| A | 9.4 | 0.0019 | quenched SiO$_2$ | 1.276 | 0.0124 | 1.31 | 0.0107 | 2.0 | 34 |
| B | 3.63 | 0.0215 | quenched SiO$_2$ | 1.276 | 0.0124 | 1.55 | 0.0015 | 2.2 | 274 |

*FIG. 1*

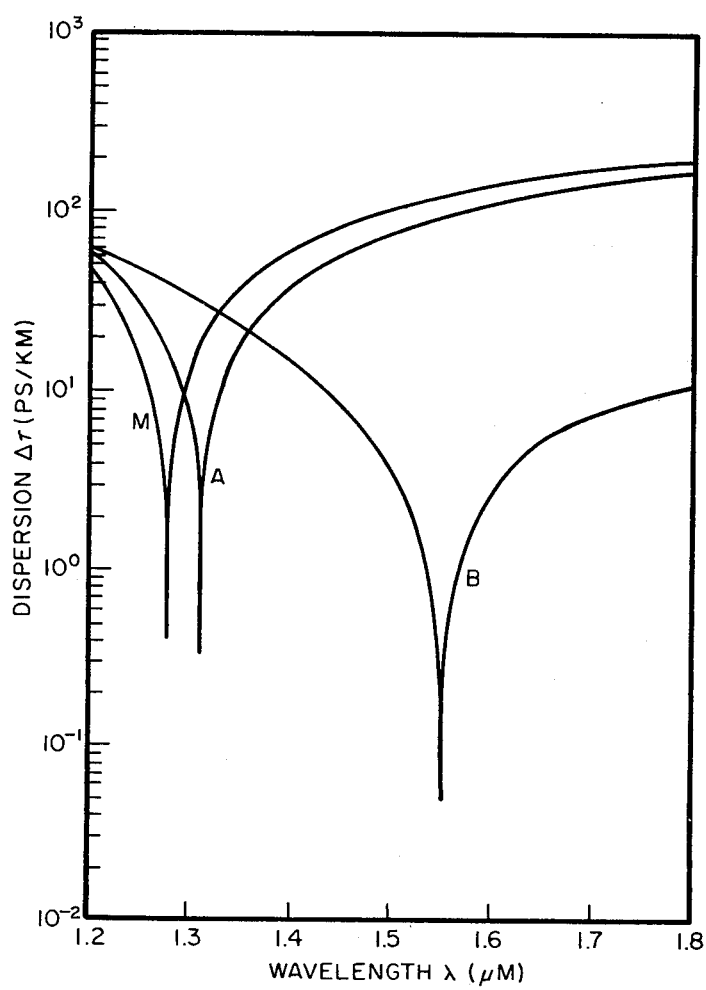

*FIG. 2*

MINIMUM DISPERSION AT 1.55 μM FOR SINGLE-MODE STEP-INDEX OPTICAL FIBERS

STATEMENT OF GOVERNMENT INTEREST

The invention described herein may be manufactured and used by or for the Government of the United States of America for governmental purposes without the payment of any royalties thereon of therefor.

BACKGROUND OF THE INVENTION

The advantages of wideband data transmission over single-mode optical fibers has become more obvious in view of the recent development of more pure silicas used for fabrication of the cores and the claddings. Of note is the observation that silica inherently possesses a relatively low attenuation of the transmitted optical energy particularly at 1.55 μm. Researchers and manufacturers are eager to exploit this favorable characteristic and seek to find the proper fiber parameters to reduce the total dispersion to a minimum to eliminate the need for repeater stations and to increase the possible transmission distance of data through the fibers.

One paper has been written which stands out in view of the recent process in optical fiber fabrication that has achieved the unheard of low-loss of 0.2 db per kilometer at 1.55 μm. The analysis of Dr. Ching T. Chang entitled "Minimum Dispersion in a Single-Mode Step Index Optical Fiber" and appearing in Applied Optics, 1979, 18, pages 2516 to 2522 concerned itself with the cancellation between the material and waveguide dispersions to predict the shift in the minimum dispersion wavelengths $\lambda_o$ for achieving total minimum dispersion in single-mode step-index fibers. The paper dealt extensively with various types of single-mode step-index fibers and predict minimum dispersion wavelengths to achieve zero first order dispersion accurately. By solving the $LP_{01}$ mode characteristic equation, Dr. Chang could calculate accurately how much of the $LP_{01}$ mode of waveguide dispersion was needed for cancellation of the material dispersion. This greater accuracy was found to result in a significant change in the minimum dispersion wavelength and second-order residual dispersion; however a further analysis seemed to be in order to provide fabricators the necessary information for making minimum loss and minimum dispersion single-mode step-index fibers.

Thus, there is a continuing need in the state-of-the-art for an improved method for fabricating single-mode, step-index fibers which take into account the relative index difference and core diameters to achieve total minimum dispersion at a 1.55 μm wavelength.

SUMMARY OF THE INVENTION

The present invention is directed to providing the parameters for a single-mode step-index fiber that assures minimum total dispersion by achieving first order cancellation between material and waveguide dispersions at 1.55 μm. First, there is a providing of a core material and cladding having a refractive index difference $\Delta$, the core material having a refractive index that creates minimum material dispersion at a wavelength other than 1.55 μm. Next, there is the dimensioning of the core to have a diameter $2a$ so that $dN/d\lambda = 0$ in the equation:

$$\frac{dN}{d\lambda} = -\lambda \frac{d^2 n_o}{d\lambda^2}\left[1 + \Delta \frac{d(bV)}{dV}\right] - \pi a \left(\frac{N_o}{\lambda}\right)^2 (2\Delta)^{1.5} \frac{d^2(bV)}{dV^2}$$

where: N is the group index of refraction including the sum of the material dispersion and the waveguide dispersion; $n_o$ is the cladding phase index; b is the normalized propagation constant; $N_o$ is the group index of refraction including material dispersion only; V is the normalized frequency $= \pi(2a/\lambda)N_o\sqrt{2\Delta}$.

OBJECTS OF THE INVENTION

It is a prime object of the invention to improve the transmission characteristics of single-mode step-index fibers.

Another object of the invention is to provide an improved single-mode step-index fiber having a core diameter dimensioned to effect a cancellation between material and waveguide dispersions.

Still another object is to provide a single-mode step-index fiber fashioned from material composition differences to effect a cancellation between material and waveguide dispersions.

Still another object is to provide a single-mode step-index fiber fashioned from material composition differences and core diameter dimensions to provide the cancellation between material and waveguide dispersions to assure lower range transmissions.

A further object is to provide a method of fabricating a single-mode step-index fiber which would be useful for wideband long distance fiber optic communication.

Another object is to provide a method of determining fiber parameters that minimize dispersion and attenuation at 1.55 μm.

These and other objects of the invention will become more readily apparent from the ensuing description and claims when taken with the drawings.

BRIEF DESCRIPTION OF THE DRAWINGS

FIG. 1 is a table of minimum dispersion calculations for two fibers, the first, A, having minimum attenuation of 0.2 db/Km at 1.55 μm with its minimum dispersion at 1.31 μm; the second fiber, a proposed fiber B has a minimum dispersion at 1.55 μm.

FIG. 2 shows dispersion as a function of wavelength for single-mode step-index fibers A and B listed in FIG. 1. The material dispersion is shown as curve M. All calculated curves are based on a source spectral width $\Delta\lambda = 5.5$ nm.

DESCRIPTION OF THE PREFERRED EMBODIMENT

Figure 5:
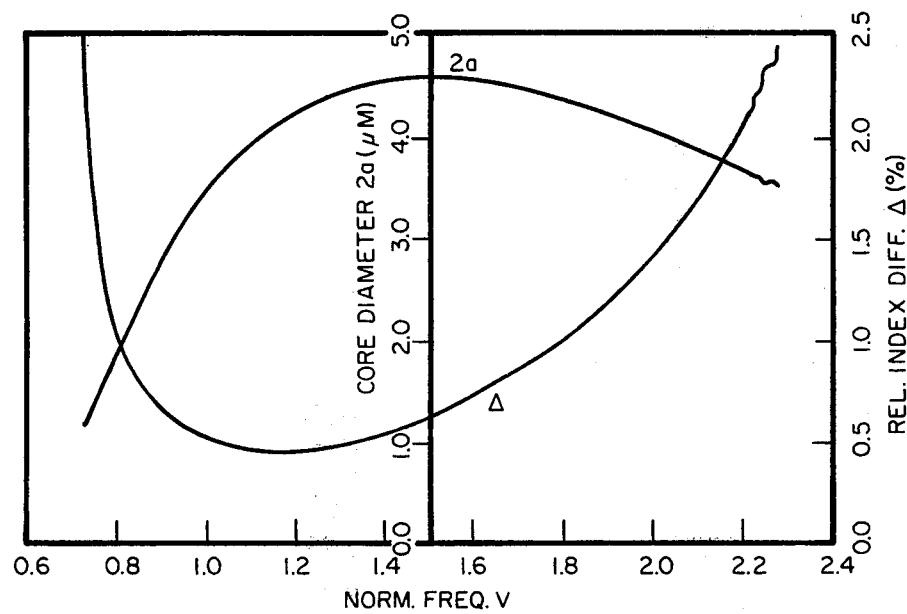
FIG. 5 portrays the 1.55 μm minimum dispersion fiber parameters $\Delta$ and $2a$ as a function of the normalized frequency V for single-mode step-index fibers.

Pulse spreading of the long wavelength single-mode optical fiber depends on the cancellation between material and waveguide dispersions of the fiber and the spectral width of the source. This conclusion has been analyzed thoroughly by Dr. Chang in his article noted above as well as two other noteworthy articles, the first being by H. Tsuchiya and N. Imoto, "Dispersion-free single-mode fiber in 1.5 μm wavelength region," Electron. Lett., 1979, 15, pp. 476-478; the other reference being by K. I. White and B. P. Nelson, "Zero total dispersion in step-index monomode fibres at 1.30 and 1.55 μm," Electron. Lett., 1979, 15, pp. 396-397.

If the source wavelength spreads symmetrically around $\lambda$ between $\lambda - \frac{1}{2}\Delta\lambda$ and $\lambda + \frac{1}{2}\Delta\lambda$, then the pulse spreading[2] $\Delta\tau$(ps/km) through the fiber will be $$\Delta\tau = \begin{cases} \left| \frac{1}{c} \frac{dN}{d\lambda} \Delta\lambda \right| & \text{for } \lambda \neq \lambda_o \\ T(\Delta\lambda)^2 \equiv \left| \frac{1}{8c} \frac{d^2N}{d\lambda^2} (\Delta\lambda)^2 \right| & \text{for } \lambda = \lambda_o. \end{cases}$$

Here N is the group index including both material and waveguide dispersions and $\lambda_o$ is the optimum wavelength to achieve zero first order total dispersion i.e., $$\left. \frac{dN}{d\lambda} \right|_{\lambda_o} = 0, \quad T \equiv \left| \frac{1}{8c} \frac{d^2N}{d\lambda^2} \right|_{\lambda_o}$$

is the residual second order dispersion in ps/(km nm²) evaluated at $\lambda_o$.

The expression for the change in the group index with respect to the first ordered total dispersion and the second order residual dispersion is well established in the art to single-mode step-index fibers, see, for example, the equations (21) and (22) of the Chang paper. The table of FIG. 1 provides a visual indication of the calculated pulse dispersion as a function of wavelength for a typical long wavelength source of spectral width 5.5 nm, (for a further discussion of this typical long wavelength source see "1.5 μm Optical transmission experiments using very low-loss single-mode fibres," by S. Machida, J. Yamada, T. Mukai, Y. Hurikoshi and H. Tsuchiya, Electron. Lett., 1979, 15, pp. 219-220.)

The parameters for the fiber designated fiber A are identical to those of the previously mentioned low-loss fiber but the fiber differs in material composition. A fiber having quenched silica may be considered as the fiber cladding material rather than 2% Germanium dioxide doped silica core material (the former choice may be better since the Sellmeier coefficients used to compute material dispersion are not available for the 2% Germanium dioxide doped silica). FIG. 2 shows that it is clear that the minimum total dispersion wavelength can be shifted from minimum material dispersion wavelength 1.276 μm to 1.31 μm (for fiber A) or 1.55 μm (for fiber B) by choosing the fiber parameters properly.

For single-mode step-index fibers with $1.15 < V < 3.0$, where V = the normalized frequency, the results of cancellation between material and waveguide dispersions are twofold; the optimum wavelength $\lambda_o$ increases and the second order residual dispersion T decreases from the corresponding quantities calculated by considering material dispersion only, see FIG. 1.

Both $\lambda_o$ and T depend on the amount of material or waveguide dispersion needed for cancellation. This cancellation in turn depends on fiber material, relative index difference $\Delta$ and the normalized frequency V (otherwise stated as a function of the fiber core diameter 2a).

Assuming the recently reported low-loss single-mode fiber has a step-index profile with a quenched silica as a fiber material, the dispersion of this fiber is minimized at $\lambda_o$ approximately equalling 1.31 μm with residual second order dispersion T = 0.0107 ps/[km·nm²] (see curve A of FIG. 2). The dispersion at 1.55 μm where the minimum attenuation is located, is calculated to be 16 ps/(km·nm) which is in good agreement with the measured value of 17 ps/(km·nm).

Figure 3:
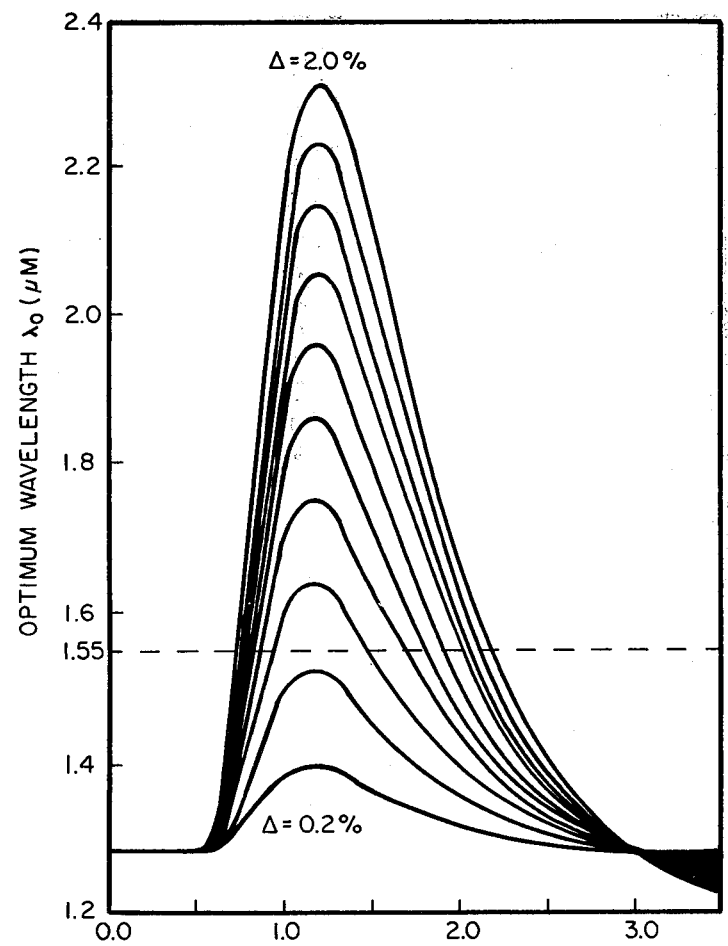
FIG. 3 depicts optimum wavelength $\lambda_o$ as a function of the normalized frequency V for single-mode step-index fibers with various relative index difference $\Delta$.
Figure 4:
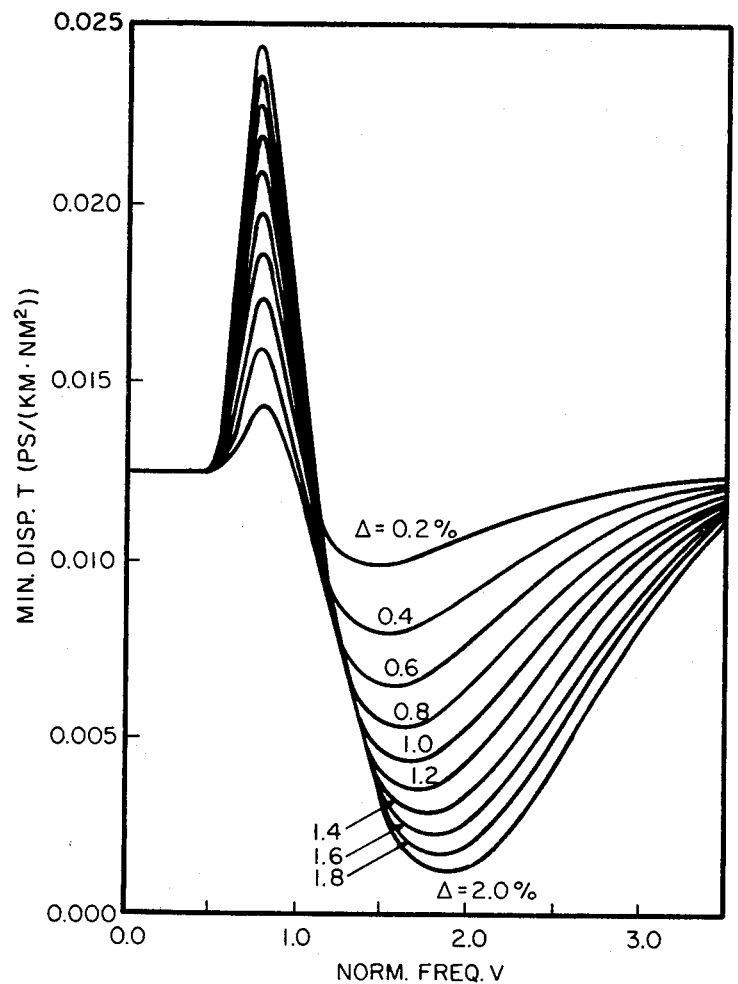
FIG. 4 shows residual second order dispersion T evaluated at the optimum wavelength $\lambda_o$ as a function of the normalized frequency V for single-mode step-index fibers with various index difference $\Delta$.

As an extension to FIG. 2 we calculate $\lambda_o$, T and V for step-index fibers with various relative index differences $\Delta$ and core diameters 2a. FIGS. 3 and 4 show the calculated results of $\Delta_o$ vs V and T vs V, respectively. The calculation procedures are similar to the procedures set forth in great detail in the applied optics article by Dr. Chang. The derivations have been dispensed with here to avoid belaboring what is obvious to one of ordinary skill in the art to which this invention pertains. The equations for first order total dispersions and second order residual dispersions are $$\frac{dN}{d\lambda} = -\lambda \frac{d^2 n_o}{d\lambda^2} \left[ 1 + \Delta \frac{d(bV)}{dV} \right] - \pi a \left( \frac{N_o}{\lambda} \right)^2 (2\Delta)^{1.5} \frac{d^2(bV)}{dV^2},$$

$$\frac{d^2N}{d\lambda^2} = -\left( \lambda \frac{d^3 n_o}{d\lambda^3} + \frac{d^2 n_o}{d\lambda^2} \right) \left[ 1 + \Delta \frac{d(bV)}{dV} \right] + 3\pi a(2\Delta)^{1.5} \frac{N_o}{\lambda} \frac{d^2 n_o}{d\lambda^2} \frac{d^2(bV)}{dV^2} + 2\pi a(2\Delta)^{1.5} \frac{N_o^2}{\lambda^3} \frac{d^2(bV)}{dV^2} + 2\pi^2 a^2 (2\Delta)^2 \frac{N_o^3}{\lambda^4} \frac{d^3(bV)}{dV^3}.$$

where N is the group index of refraction including the sum of the material dispersion and the wavelength dispersion; $N_o$ is the group index of refraction including material dispersion only; $n_o$ is the cladding phase index and b is the normalized propagation constant defined as being equal to $W^2/V^2$; V is the normalized frequency otherwise expressed as $= \pi(2a/\lambda) N_o \sqrt{2\Delta}$.

These equations are derived from the characteristic equation for the $LP_{01}$ mode of propagation:

$$F(W) = [UJ_1(U)/J_o(U)] - [WK_1(W)/K_o(W)] = 0,$$

with
$U = (V^2 - W^2)^{\frac{1}{2}}$,
$V = akn_o(2\Delta)^{\frac{1}{2}} = (2\pi a/\lambda)n_o(2\Delta)^{\frac{1}{2}}$, where $J_o$, $J_1$, $K_o$ and $K_1$ are Bessel and modified Hankel functions of zero and the first order, respectively.

In FIG. 3 the horizontal line indicates the optimum wavelength $\lambda_o = 1.55$ μm. The intersections between this line and various $\lambda_o$ vs. V curves in FIG. 3 indicate the fiber parameters $\Delta$ and $V = (2\pi a n_o/\lambda_o)\sqrt{2\Delta}$ to achieve minimum dispersion at 1.55 μm. The fiber parameters $\Delta$ and 2a at 1.55 μm also are plotted as a function of the normalized frequency V in FIG. 5.

The waveguide dispersion for a given single-mode fiber becomes small for either short or long wavelengths because the optical power is predominantly carried by the core or the cladding, respectively. This in turn causes the total dispersion to approach the material dispersion for both short and long wavelengths as demonstrated in FIG. 2.

In the Chang Applied Optics article he demonstrated that waveguide dispersion is proportional to $$\frac{\Delta}{\lambda} V \frac{d^2(bV)}{dV^2}.$$

To obtain the finite waveguide dispersion for cancellation of the material dispersion at 1.55 μm, Δ will be inversely proportional to $$V \frac{d^2(bV)}{dV^2}.$$

From this it will be noted that the Δ vs V curve in FIG. 5 has a minimum of Δ=0.47% at V≈1.15 where $$V \frac{d^2(bV)}{dV^2}.$$

These results come in agreement with the exhaustive treatment of the subject by S. Machida, J. Yamada, T. Mukai, Y. Hurikoshi and H. Tsuchiya: "1.5 μm Optical transmission experiments using very low-loss single-mode fibres," Electron. Lett., 1979, 15, pp. 219–220, and is consistent with the material depicted in FIG. 3. For a V different from 1.15, Δ must be increased as shown in FIG. 5.

We have assumed dΔ/dλ=0 in all of our calculations because Sellmeier coefficients associated with different doping in silica are not available for various Δ values used. dΔ/dλ>0 implies more waveguide dispersion at longer wavelength. This in turn will make $\lambda_o$ longer than predicted in our calculation and bring our results for V>2.0 a little closer to those predicted by White and Nelson in their article entitled "Zero total dispersion in step-index mononiode fibres at 1.30 and 1.55 μm," Electron. Lett., 1979, 15, pp 396–397. The difference in $\lambda_o$ due to dΔ/dλ+0 and dΔ/dλ=0 is found to be on the order of 10 nm, while waveguide dispersions obtained by accurate solution of the characteristic equation and by using Rudolph and Neumann's approximation can result in much more difference in $\lambda_o$, see Rudolph's and Neumann's "Approximations for the eigenvalues of the fundamental mode of a step index glass fibre waveguide," Nachrichtentech. Z., 1976, pp. 328–329. Thus we conclude that the accurate calculation of waveguide dispersion is needed in predicting $\lambda_o$ to achieve minimum dispersion of a single-mode step-index fiber.

By solving the equation set forth above the values of Δ and 2a are obtained. These values represent the physical parameters that will assure first order cancellation between material and waveguide dispersions at 1.55 μm. The material of the core is doped with germanium dioxide so as to create the identified index difference between the core and cladding. There are many different techniques for producing fibers having the proper amount of doping agents to establish wanted refractive indices. A highly satisfactory method is the modified vapor deposition method of fabricating high silica fibers. This and related manufacturing techniques are thoroughly disclosed in *Optical Fiber Telecommunication* by Stuart E. Miller and Allen G. Chynoweth, Academic Press, N.Y. 1979. Another article sets forth an example of single mode fibers having different core diameters and refractive indexes is by Miya, T., Terunuma, Y., Hasaka, T., and Miyashita, T., "Ultimate low-loss single-mode fiber at 1.55 μm" Electronics Letters, 1979, 15, pp. 106–108.

Drawing fibers as they cool produces the desired core diameters. Typically, cores in single-mode fibers are in the neighborhood of 4 to 5 μm. An entire chapter is devoted to the drawing and control of the drawing operation in the telecommunications publication; one which would lend itself particularly to this application is the technique outlined by W. G. French et al, pp. 275 et seq of the telecommunication book.

Looking to FIG. 5 of the drawings, a pair of curves representative have been derived from the equation for values of Δ and 2a needed for minimum dispersion at 1.55 μm. These permit a designer to identify a particular diameter for a given refractive index difference or vica versa. For example, having index difference of Δ=1% locate the point of intersection a perpendicular line from the relative index difference base line makes with the Δ curve. From this point locate a line parallel to the relative index difference base line to where it intersects the 2a curve. Through this point intersect a line perpendicular from the relative index difference base line to the core diameter base line. Where the last line intersects the core diameter base line, a value is read which is the core diameter for the given Δ of 1% for 1.55 μm, in this case about 4.4 μm.

Figure 6:
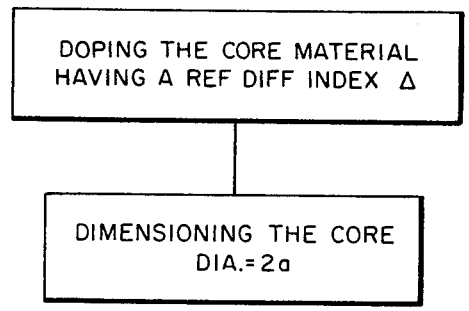
FIG. 6 is a block diagram representation of the method of designing a minimum dispersion fiber.

The steps of providing a core material having a refractive index Δ and the dimensioning of the core is shown in block diagram form in FIG. 6. Three dimensions are obtained from the equations that can be more accurately solved. A properly programmed computer can enable the solution of the equation more quickly and accurately. This assures the proper refractive index differencing and the dimensioning of the core.

Obviously many modifications and variations of the present invention are possible in the light of the above teachings. It is therefore to be understood that within the scope of the appended claims the invention may be practiced otherwise than as specifically described.

What is claimed is:

1. A method of fabricating a step-index single-mode optical fiber that provides minimum total dispersion by achieving first order cancellation between material and waveguide dispersions at 1.55 μm comprising:

providing a core material and cladding material having a refractive index difference Δ, the core material having a refractive index that creates minimum material dispersion at other than 1.55 μm and dimensioning the core to have a diameter 2a so that dN/dλ=0 in accordance with $$\frac{dN}{d\lambda} = -\lambda \frac{d^2 n_o}{d\lambda^2}\left[1 + \Delta \frac{d(bV)}{dV}\right] -$$

$$\pi a \left(\frac{N_o}{\lambda}\right)^2 (2\Delta)^{1.5} \frac{d^2(bV)}{dV^2}$$

where: λ is wavelength; N is the group index of refraction including the sum of the material dispersion and the waveguide dispersion; $n_o$ is the cladding phase index; b is the normalized propagation constant; $N_o$ is the group index of refraction including material dispersion only; $V$ is the normalized frequency $=\pi(2a/\lambda)N_o\sqrt{2\Delta}$.

2. A method according to claim 1 in which the core material is silica.

3. A method according to claim 2 in which the step of providing includes the doping the core of silica with germanium dioxide the proper amount to create the relative refractive index difference $\Delta$.

* * * * *